US012600250B2

(12) United States Patent
Schwan et al.

(10) Patent No.: US 12,600,250 B2
(45) Date of Patent: Apr. 14, 2026

(54) PLUG COVER FLAP HINGE FOR A PLUG CONNECTOR AND CONNECTOR ASSEMBLY COMPRISING SUCH A HINGE

(71) Applicant: TE Connectivity Germany GmbH, Bensheim (DE)

(72) Inventors: Ralf Schwan, Bensheim (DE); Dominik Heiss, Bensheim (DE); Mike Iskra, Bensheim (DE); Talat Salman, Bensheim (DE)

(73) Assignee: TE Connectivity Germany GmbH, Bensheim (DE)

( * ) Notice: Subject to any disclaimer, the term of this patent is extended or adjusted under 35 U.S.C. 154(b) by 328 days.

(21) Appl. No.: 18/312,087

(22) Filed: May 4, 2023

(65) Prior Publication Data

US 2023/0356610 A1 Nov. 9, 2023

(30) Foreign Application Priority Data

May 4, 2022 (DE) .......................... 102022111016.8

(51) Int. Cl.
| | |
|---|---|
| *H01R 13/447* | (2006.01) |
| *B60L 53/16* | (2019.01) |
| *E05D 7/00* | (2006.01) |
| *E05F 1/12* | (2006.01) |
| (Continued) | |

(52) U.S. Cl.
CPC ................ *B60L 53/16* (2019.02); *E05D 7/00* (2013.01); *E05F 1/12* (2013.01); *H01R 13/447* (2013.01); *H01R 13/5202* (2013.01);

*E05F 15/00* (2013.01); *E05Y 2201/47* (2013.01); *E05Y 2900/534* (2013.01); *H01R 2201/26* (2013.01)

(58) Field of Classification Search
None
See application file for complete search history.

(56) References Cited

U.S. PATENT DOCUMENTS

| | | | |
|---|---|---|---|
| 5,106,326 A | 4/1992 | Tsuji et al. | |
| 5,306,999 A * | 4/1994 | Hoffman ................. | B60L 53/16 320/109 |
| 5,582,521 A | 12/1996 | Mori et al. | |
| (Continued) | | | |

FOREIGN PATENT DOCUMENTS

| | | | | |
|---|---|---|---|---|
| CN | 113272513 A * | 8/2021 | ............ | B60K 15/05 |
| DE | 202006003309 U1 | 8/2006 | | |
| (Continued) | | | | |

OTHER PUBLICATIONS

Korean Office Action dated Oct. 25, 2024 with English translation, corresponding to Application No. 10-2023-0057782, 12 pages.

(Continued)

*Primary Examiner* — Tho D Ta
(74) *Attorney, Agent, or Firm* — Barley Snyder

(57) ABSTRACT

A plug cover hinge of a charging connection of an electric vehicle includes a cover or cover flap for selectively covering a socket or plug of the charging connection, and a four-joint hinge. The four-joint hinge defines two flap-side joints attached to the cover flap, and two fastening-side joints attachable to a frame. The four-joint hinge includes two joint elements, with each joint element connecting one of the flap-side joints to one of the fastening-side joints.

19 Claims, 7 Drawing Sheets

(51) Int. Cl.
  *H01R 13/52*      (2006.01)
  *E05F 15/00*      (2015.01)

(56)                References Cited

U.S. PATENT DOCUMENTS

| | | | |
|---|---|---|---|
| 7,419,391 | B2 | 9/2008 | Schmidt |
| 10,577,845 | B2 | 3/2020 | Herczeg |

FOREIGN PATENT DOCUMENTS

| | | | | | |
|---|---|---|---|---|---|
| DE | 102010051581 | A1 | 5/2012 | | |
| DE | 202016105735 | U1 | 12/2016 | | |
| DE | 102016223010 | A1 * | 5/2018 | ............ | B60K 15/05 |
| DE | 102017223396 | A1 * | 6/2019 | | |
| EP | 2882046 | A1 | 6/2015 | | |
| JP | 2017222347 | A | 12/2017 | | |
| WO | 2013111125 | A2 | 8/2013 | | |

OTHER PUBLICATIONS

Office Action from the Deutsches Patent and und Markenamt dated Feb. 8, 2023, corresponding to Application No. 10 2022 111 016.8, 6 pages.

* cited by examiner

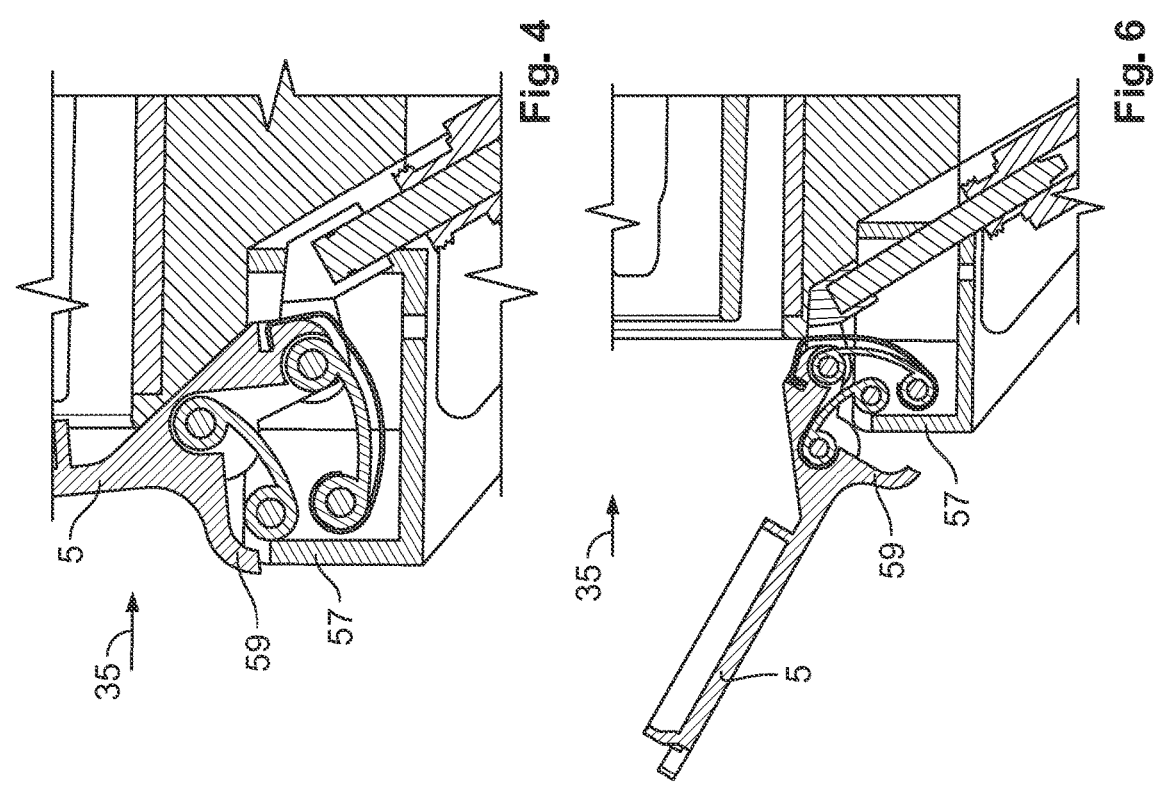
Fig. 4
Fig. 6
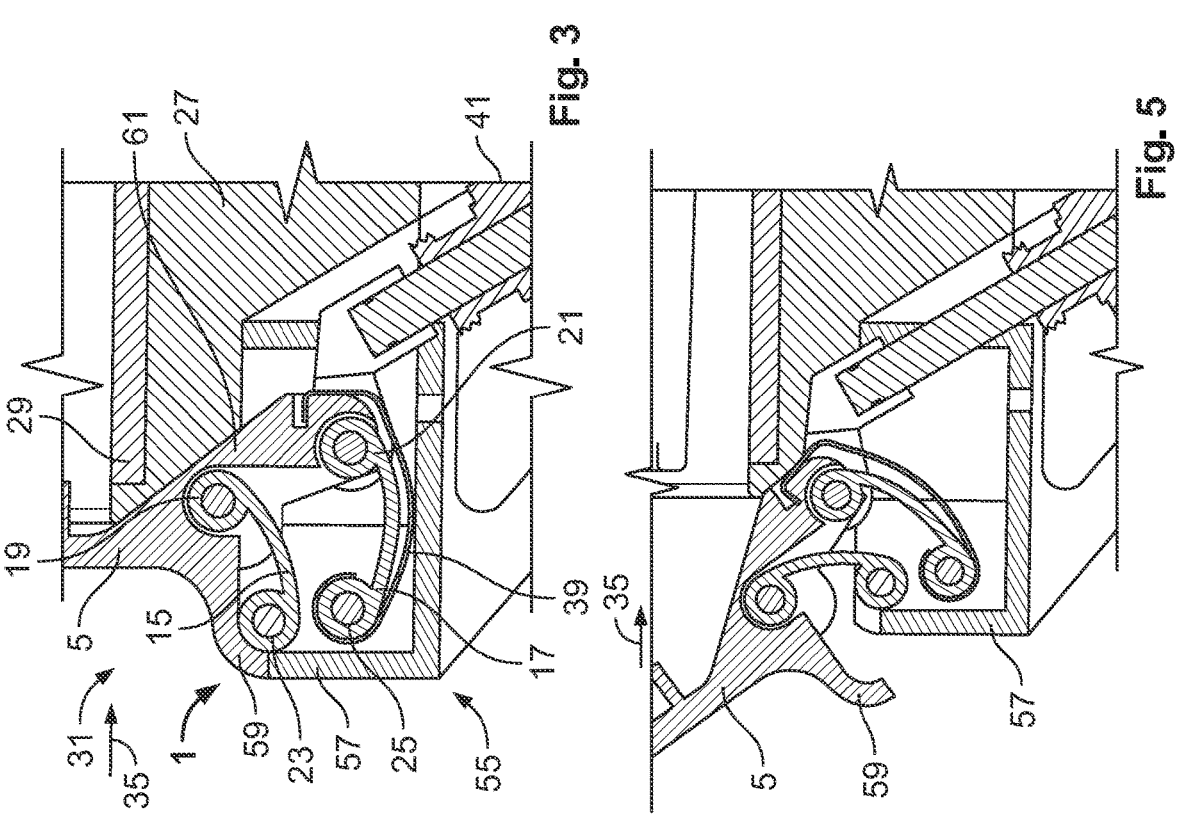
Fig. 3
Fig. 5

PLUG COVER FLAP HINGE FOR A PLUG CONNECTOR AND CONNECTOR ASSEMBLY COMPRISING SUCH A HINGE

CROSS-REFERENCE TO RELATED APPLICATION

This application claims the benefit of German Patent Application No. 102022111016.8 filed on May 4, 2022, the whole disclosure of which is incorporated herein by reference.

FIELD OF THE INVENTION

The present invention relates electrical connectors, and in particular, a plug cover or cover flap having a hinge assembly for a charging connection of an electric vehicle.

BACKGROUND

Plug covers or clover flaps that include hinges and associated electrical connector assemblies are known. Specifically, a cover or cover flap of a plug cover flap hinge assembly is used to selectively cover a plug connector. Covering the plug connector may be necessary to protect it from external influences or to prevent accidental contact with live parts of the plug connector.

Known cover flaps are typically connected to a connector housing or another stationary part via a joint, such as a rotating hinge. Hinges of the prior art, however, limit the movement of the cover flap along a circular path. This restricted motion of the cover flap can negatively affect the ability of the cover flap to, for example, form a reliable seal or be securely locked in both open and closed positions. Further, the limited range of motion can impose design limitations on the connector itself.

SUMMARY

A plug cover hinge of a charging connection of an electric vehicle according to an embodiment of the present disclosure comprises a cover or cover flap for selectively covering a socket or plug of the charging connection, and a four-joint hinge. The four-joint hinge defines two flap-side joints attached to the cover flap, and two fastening-side joints attachable to a frame. The four-joint hinge includes two joint elements, with each joint element connecting one of the flap-side joints to one of the fastening-side joints.

BRIEF DESCRIPTION OF THE DRAWINGS

These and/or other aspects, features, and advantages of the invention will become apparent and more readily appreciated from the following description of example embodiments, taken in conjunction with the accompanying drawings of which:

FIG. 3-7 are side cross-sectional views illustrating an opening process of the plug cover flap hinge of FIG. 1 from the cover position to the open position;

DETAILED DESCRIPTION

Figures 1, 2:
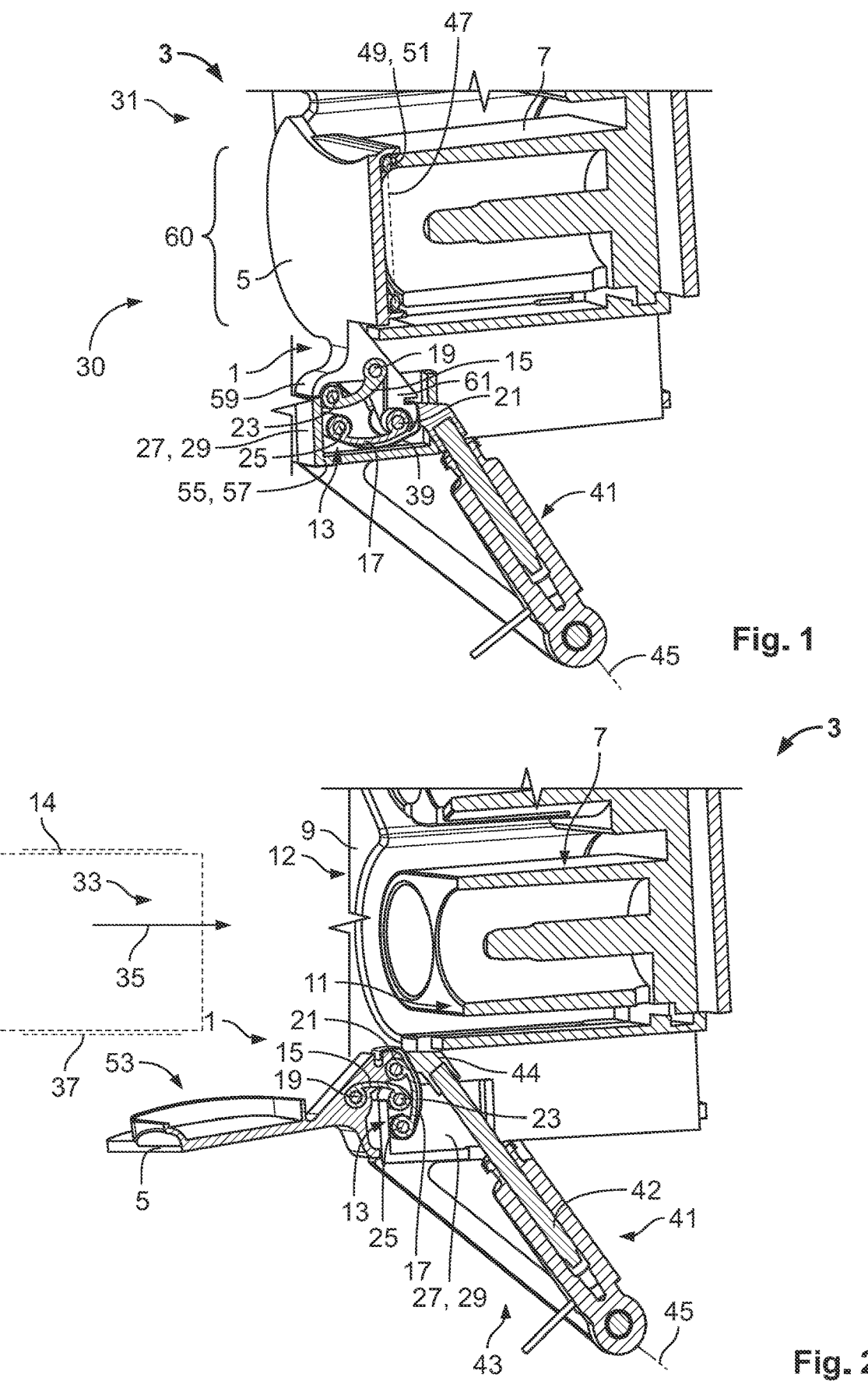
FIG. 1 is a perspective cross-sectional view of a first embodiment of a connector assembly having a plug cover flap hinge according to the invention in a closed or cover position.
FIG. 2 is a perspective cross-sectional view of the connector assembly of FIG. 1 in an open or uncovered position.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

A general structure of a first preferred embodiment of a plug cover flap hinge 1 according to the invention is described with reference to FIGS. 1 and 2. Further details of the plug cover flap hinge 1 and its function are described below with reference to FIGS. 3-7.

The plug cover flap hinge 1 of the first embodiment is shown as part of a connector assembly 3. The plug cover flap hinge 1 has a cover or cover flap 5 which can be used to selectively cover a plug connector 7, in particular its plug face 9. The plug connector 7 is preferably a charging connection 12 arranged on a vehicle side of an electric vehicle. Alternatively, or in addition thereto, the cover flap 5 may also be used to close a socket 11 for receiving a mating connector 14 for the plug connector 7. The section of the cover flap 5 which covers the plug connector 7 is hereinafter referred to as section 60 of the cover flap 5. In some embodiments, the cover flap 5 is used to cover a combination of the socket 11 and the plug face 9. Thus, the plug face 9 may be located within the socket 11.

The plug cover flap hinge 1 comprises, in addition to the cover flap 5, a four-joint hinge 13. The four-joint hinge 13 includes a joint element 15 and a joint element 17. Each joint element 15,17 is movably connected to the cover flap 5 via a respective flap-side joint 19,21. Each joint element 15,17 has a fastening-side joint 23,25 at one end spaced apart from the joint 19,21 on the flap side. The fastening-side joints 23,25 are used for movably and captively holding the joint elements 15,17, and thus the cover flap 5, on a frame 27. The frame 27 in this context means a stationary structure with respect to the plug cover flap hinge 1.

Preferably, the frame 27 is a connector housing 29 for the plug connector 7. Alternatively, the frame 27 may be connected to the connector housing 29. In some embodiments, the frame 27 is the body of a vehicle (e.g., an electric vehicle). The socket 11 and/or the plug face 9 are preferably parts of the connector housing 29, and particularly preferably formed monolithically therewith. The connector housing 29 and the plug cover flap hinge 1 preferably form a preassembled unit 30. The cover flap 5 is preferably held captively on the connector housing 29 via the four-joint hinge 13.

The cover flap 5 can be moved by the four-joint hinge 13 between a cover or closed position 31 and an uncovered or open position 33. The cover position 31 is shown in FIG. 1 and the open position 33 in FIG. 2. In the cover position 31, the plug connector 7 is covered and thus protected against external influences. Due to the four-joint hinge 13, a theoretical axis of rotation of the movement of the cover flap 5 between the open position 33 and the cover position 31 lies outside the cover flap 5.

In the open position 33, the plug connector 7 is accessible from the outside or exterior of a remainder of the connection. If the plug connector 7 is the charging connection 12 of an electric vehicle, it is accessible via a charging gun for charging the vehicle battery in the open position 33. In the open position 33, the socket 11 and/or the plug face 9 is preferably accessible without obstruction along a plug-in direction 35 of the plug connector 7. Thus, for example, a connecting channel 37 (indicated by a dashed line in FIG. 2) can extend parallel to the plug direction 35 to the plug connector 7 without obstructions. The cover flap 5 is located outside the channel 37 in the open position 33. A cross-section of the channel 37 is preferably at least as large as a cross-section of the plug face 9, particularly preferably as large as a cross-section of the socket 11.

The plug cover flap hinge 1 can preferably be locked in the cover position 31 and/or in the open position 33. Particularly preferably, the plug cover flap hinge 1 can be locked in each of the two positions 31 and 33. Thus, it can be ensured that the cover flap 5 does not open unintentionally in the cover position 31 or does not close unintentionally in the open position 33.

At least one spring element 39 is preferably provided for selectively locking the clover flap 5. Specifically, the at least one spring element 39 is configured to exert a spring force on the cover flap 5. In the cover position 31, the spring element 39 preferably exerts a spring force on the cover flap 5 in the direction of the cover position 31. In the open position 33, however, the spring element 39 preferably exerts a spring force on the cover flap 5 in the direction of the open position 33. As an alternative to locking by a spring force, the cover flap 5 can also be locked in another way. For example, the plug cover flap hinge 1 can have an inhibition by means of which the cover flap can be repeatedly detachably locked in at least one of the two positions 31 and 33.

The cover flap 5 can be operated manually. Alternatively, or additionally, the cover flap 5 can be operated automatically. For this purpose, the plug cover flap hinge 1 can comprise a drive device 41 configured to move the cover flap 5. Preferably, the plug cover flap hinge 1 is configured such that, even in the presence of a drive device 41, manual operation is still possible. In this way, the cover flap 5 can be operated even in the event of a malfunction of the drive device 41. The drive device 41 may comprise, for example, a magnet, an actuator, a hydraulic device, a linear motor, an electric motor, or other suitable system for generating a movement. The drive device 41 can engage on the output side of the cover flap 5 or on one of the two joint elements 15 or 17. In the embodiment shown in FIGS. 1-7, the drive device 41 engages at the point on the cover flap 5 at which the flap-side joint 21 is also arranged.

An engagement point of the drive device 41 proximate to the four-joint hinge 13 allows a large opening angle of the cover flap 5 with a small stroke of the drive device. In order to achieve a space-saving arrangement, the drive device 41, or a movable lifting element 42 of the drive device, is connected to the joint 21 via an angled connecting element 44.

In order to support the drive device 41, it is preferably attached to the frame 27. Particularly preferably, the drive device 41 is firmly connected to the connector housing 29. For this purpose, the connector housing 29 can, for example, have a cantilever 43 which extends away from the remaining connector housing, in particular from the area of the cover flap 5. The cantilever 43 may extend rearwardly along a cantilever direction 45, the cantilever direction extending between the plug-in direction 35 and a plane 47 of the plug face 9. The plane 47 of the plug face 9 is indicated in FIG. 1. Preferably, the plane 47 extends perpendicularly to the plug-in direction 35.

In the cover position 31, a sealing element 49 may be located between the plug face 9 and the cover flap 5. The sealing element 49 is indicated in FIG. 1 as a cross-section by a sealing ring 51. The sealing element 49 is preferably firmly attached to an inner side 53 of the cover flap 5.

In the following, further details of the plug cover flap hinge 1 and its function are described with reference to FIGS. 3 and 7.

The connector assembly 3, preferably the connector housing 29, has a protrusion 55 projecting forward (i.e., against the mating direction 35). The two fastening-side joints 23,25 are attached to the protrusion 55. The joints 23,25 are protected from the outside by a wall 57. The cover flap 5 is provided with a protective element 59 which is spaced apart from the section 60 of the cover flap 5 which covers the plug face 9 in the cover position 31.

The protective element 59 preferably lies flush against the wall 57 in the cover position 31 and extends transversely to the plug-in direction 35. Thus, the components of the four-joint hinge 13 can be protected against external influences. The protective element 59 is a monolithic part of the cover flap 5.

The cover flap 5 has a cantilever 61 extending away from the section 60 of the cover flap 5. In the cover position 31, the cantilever 61 extends inward into the frame 27. The two flap-side joints 19,21 are attached to the cantilever 61. The flap-side joint 21 of the joint element 17 is spaced apart from the section 60 of the cover flap 5 further than the flap-side joint 19 of the joint element 15.

The spring element 39 is connected at one end in the region of the fastening-side joint 25 of the joint element 17 and at the other end to the cover flap 5, with the spring element 39 thereby engaging around the joint element 17. In the region of the flap-side joint 21 of the joint element 17, the spring element 39 engages in the cantilever 61 of the cover flap 5.

In the cover position 31, the spring element 39 pulls the cantilever 61 in the direction of the fastening-side joint 25.

This tensions the cover flap 5 in the direction of the cover position 31. The spring element 39 is preferably a leaf spring.

Figure 7:
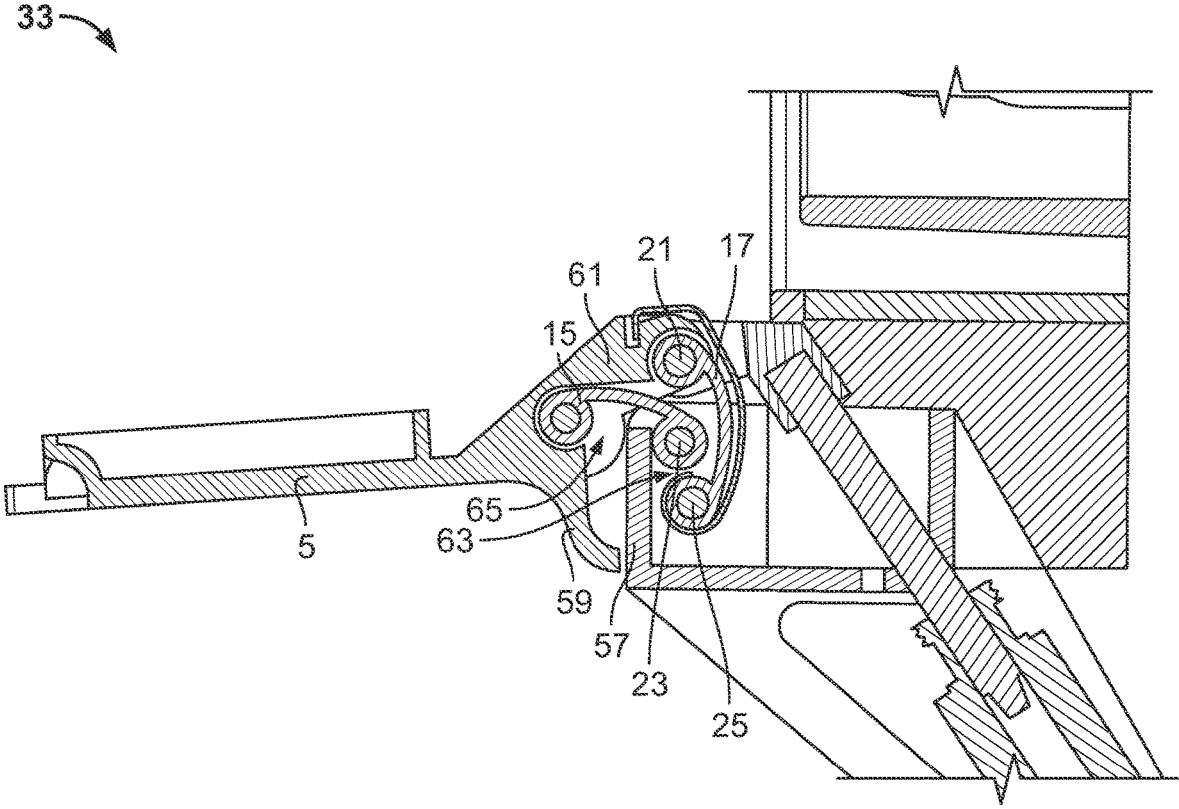

FIGS. 4-6 illustrate the transition from the cover position 31 to the open position 33, which is shown in FIG. 7.

FIG. 4 shows the beginning of the movement of the cover flap 5 from the cover position 31. It can be seen that the protective element 59 of the cover flap 5 is not tilted at the wall 57 and rotated around it, but moves away from it against the plug-in direction 35 and lifts off transversely to the plug-in direction 35. The transition from the cover position 31 to the open position 33, or vice versa, can be performed manually or automated by the drive device 41. The section 60 of the cover flap 5 covering the plug face 9 in the cover position 31 is not exclusively tilted away from the plug face 9 during this movement, but also moves away from the plug face 9 parallel along the plug-in direction 35, at least to a certain extent. Thus, a pivoting movement takes place. The type of movement described above can prevent damage to the plug face 9, to the cover flap 5, and, if provided, to a sealing element 49.

In the further course, the cover flap 5 continues to move further away from the plug face 9. Specifically, the protective element 59 moves toward the wall 57 from the outside. In the open position 33, the protective element 59 can be supported on the wall 57. In this way, a defined end of the movement of the cover flap 5 into the open position 33 can be achieved. In the open position 33, the fastening-side joint 23 of the joint element 15 can be arranged between the two joints 21,25 of the joint element 17. In this state, in which the joints 21,23,25 are in line, a center of the spring force generated by the spring element 39 is reached. The spring element 39 is thereby tensioned between the joints 19,25.

Preferably, both joint elements 15,17 are arcuate in shape, so that each joint element 15,17 has a free space which extends between the two joints of the joint element and is bounded only from one side by the part of the joint element which connects the two joints.

In such a free space 63 of the joint element 17, the fastening-side joint 23 of the joint element 15 is arranged in the open position 33. The wall 57 of the projection 55 extends in sections into the free space 65 of the joint element 15 in the open position 33. In the open position 33, the spring element 39 exerts a pull on the cantilever 61, which applies a spring force to the cover flap 5 such that the protective element 59 is pressed against the wall 57. As a result, the cover flap 5 remains locked in the open position 33.

Figure 8:
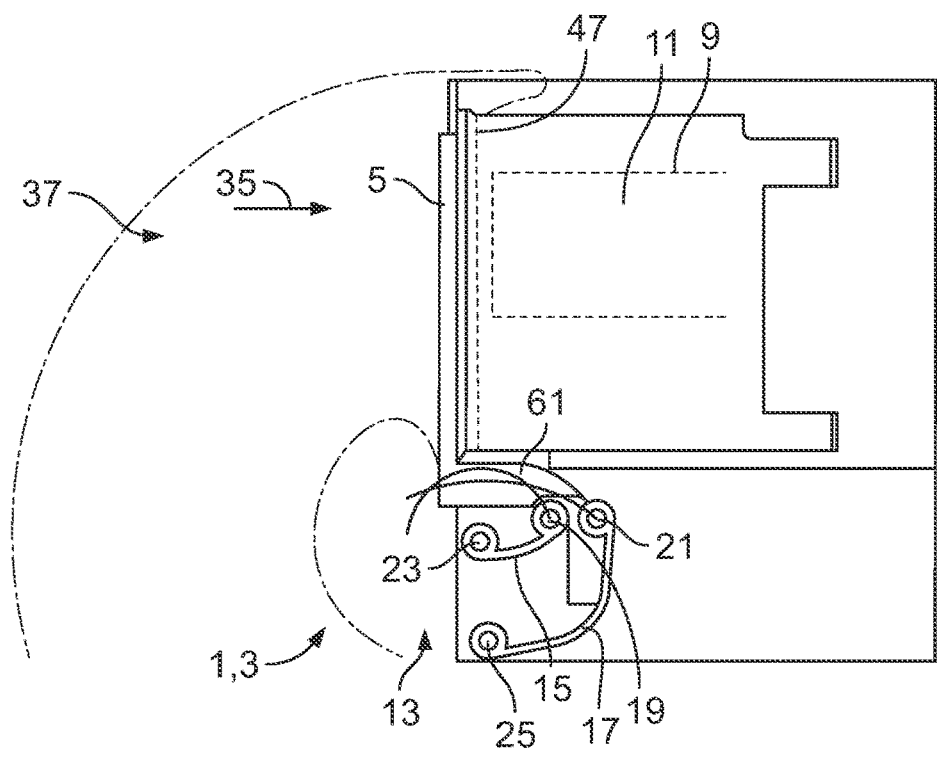
FIG. 8 is a side view of a second embodiment of a connector assembly having a plug cover flap hinge according to the invention in the cover position.
Figure 9:
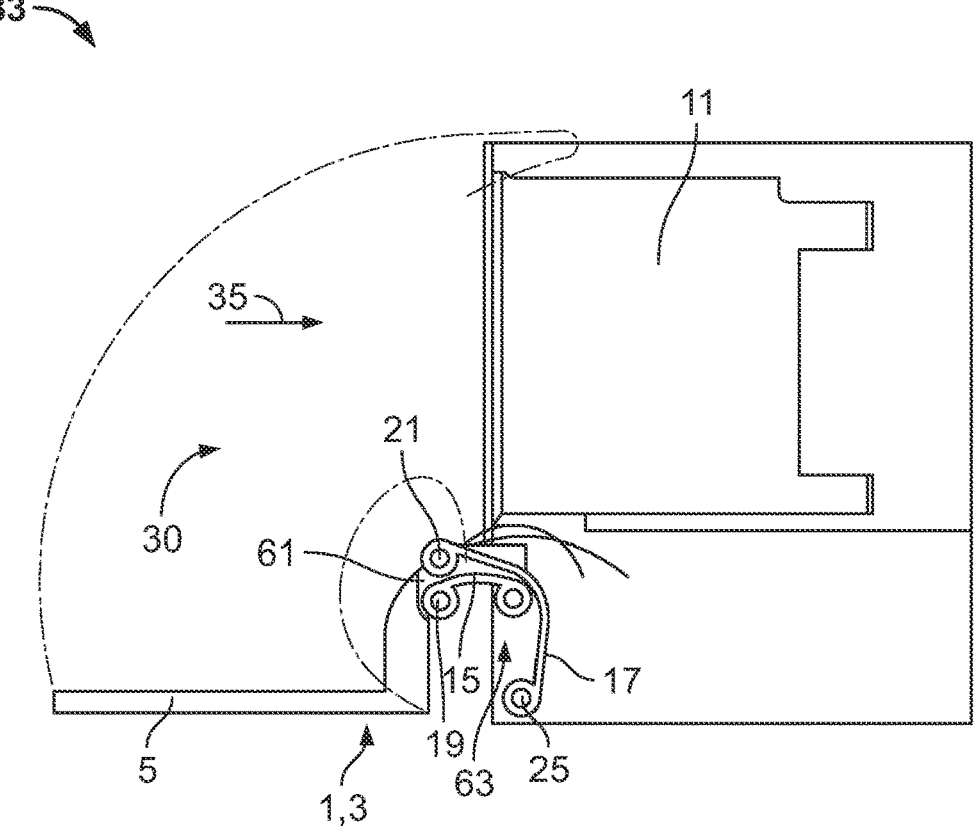
FIG. 9 is a side view of the connector assembly of FIG. 8 in the open position.

In the following, a further preferred embodiment of a plug cover flap hinge 1 according to the invention as part of a connector assembly 3 is described with reference to FIGS. 8 and 9. For the sake of brevity, only the differences from the first embodiment previously described with reference to FIGS. 1-7 are discussed.

In contrast to the first embodiment, the second embodiment does not have a protrusion 55. The second embodiment can therefore be preferred in the event that the connector assembly 3 is to be substantially planar on its outside. While the two joint elements 15,17 of the first embodiment are substantially equal in length, in the second embodiment the joint element 17 is at least twice as long as the joint element 15. The two fastening-side joints 23,25 of the joint elements 15 and 17 are spaced apart by a distance which is approximately equal to the length of the joint element 15.

The positions of the flap-side joints 19,21 are flush with each other parallel to the plug-in direction 35 in the cover position 31. During the transition from the cover position to the open position 33, the joint element 17 moves around the joint element 15 until the positions of the two flap-side joints 19,21 are flush with each other in the open position transverse to the plug-in direction 35. In the open position 33, the joint element 15 lies to a large extent in the free space 63 of the joint element 17.

Figures 10, 11:
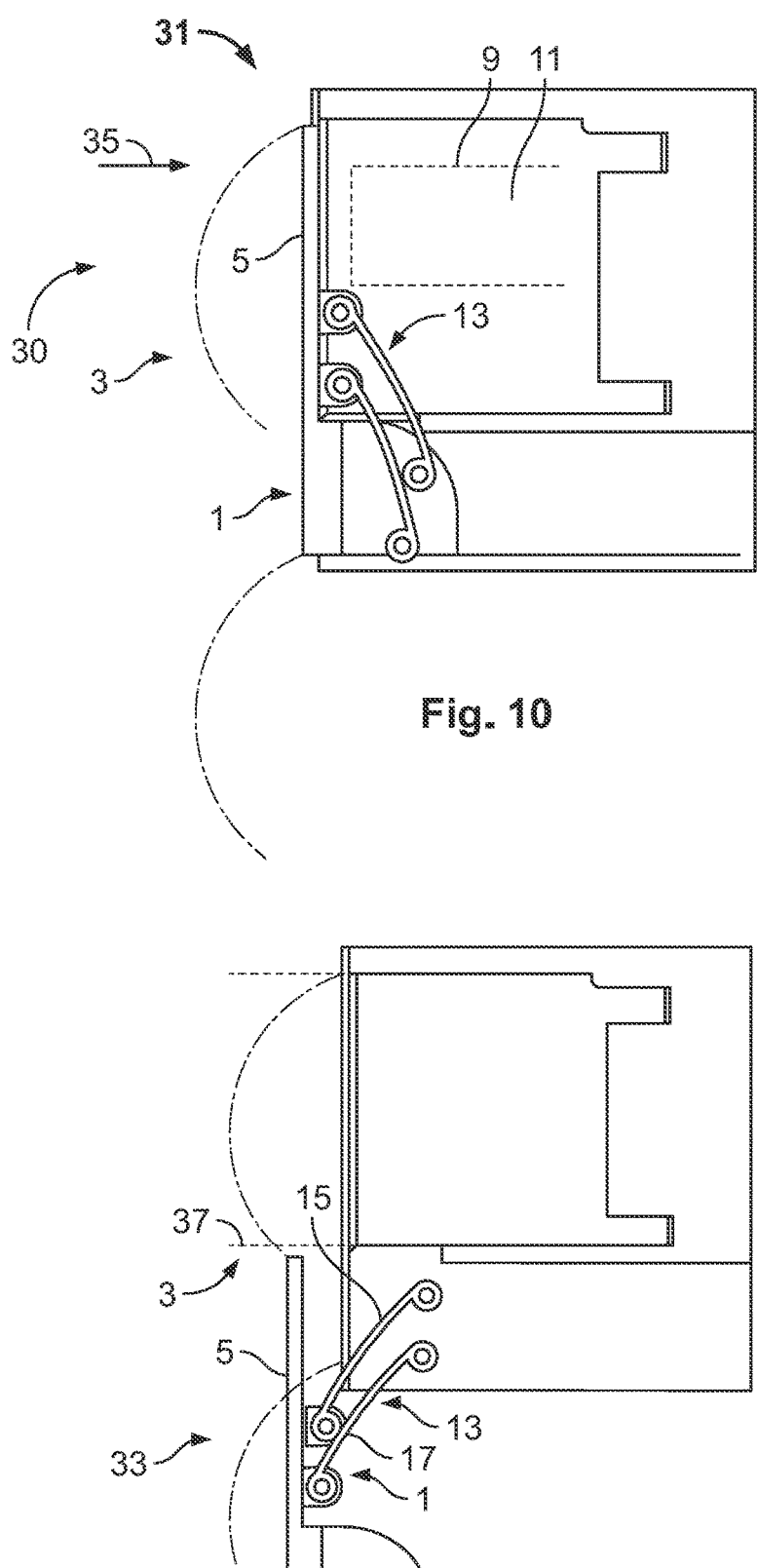
FIG. 10 is a side view of a third embodiment of a connector assembly with a plug cover flap hinge according to the invention in the cover position.
FIG. 11 is a side view of the connector assembly of FIG. 10 in the open position.

In the following, a third preferred embodiment of a plug cover flap hinge 1 as part of a connector assembly 3 is described with reference to FIGS. 10 and 11. Again, for the sake of brevity, only the differences from the previously described embodiments are discussed.

The plug cover flap hinge 1 of the third embodiment has a four-joint hinge 13 which is essentially in the form of a parallelogram. That is, the two joint elements 15,17 are substantially equal in length and extend substantially parallel to each other in both the cover position 31 and the open position 33. Consequently, the distance between the two flap-side joints 19,21 is substantially equal to the distance between the two fastening-side joints 23,25.

Due to the parallelogram shape, the cover flap 5 can only be lifted slightly against the plug-in direction 35 when moving from the cover position 31 to the open position 33. During the further movement, however, the cover flap 5 is displaced in parallel transverse to the plug-in direction. In other words, the cover flap 5 is not rotated, but lifted along an arcuate path from the plug face 9 or the socket 11. In the open position 33, the cover flap 5 is outside the connection channel 37.

Figure 12:
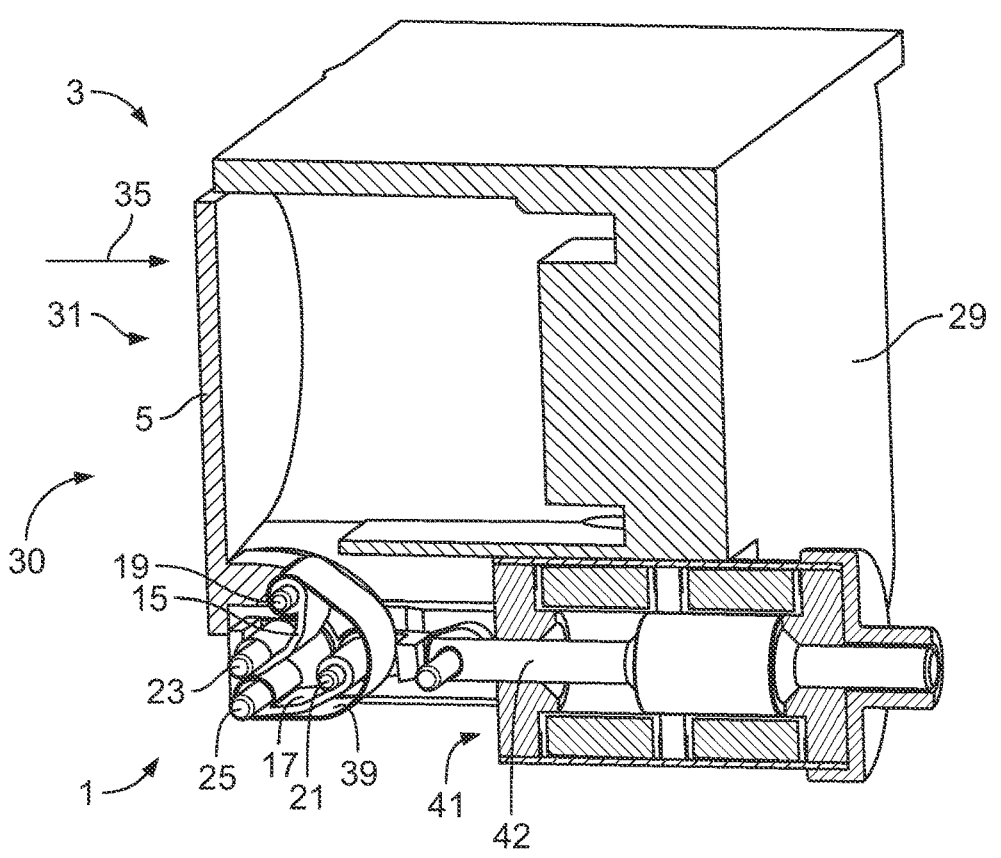
FIG. 12 is perspective cross-sectional view of a fourth embodiment of a connector assembly with a plug cover flap hinge according to the invention in the cover position.
Figure 13:
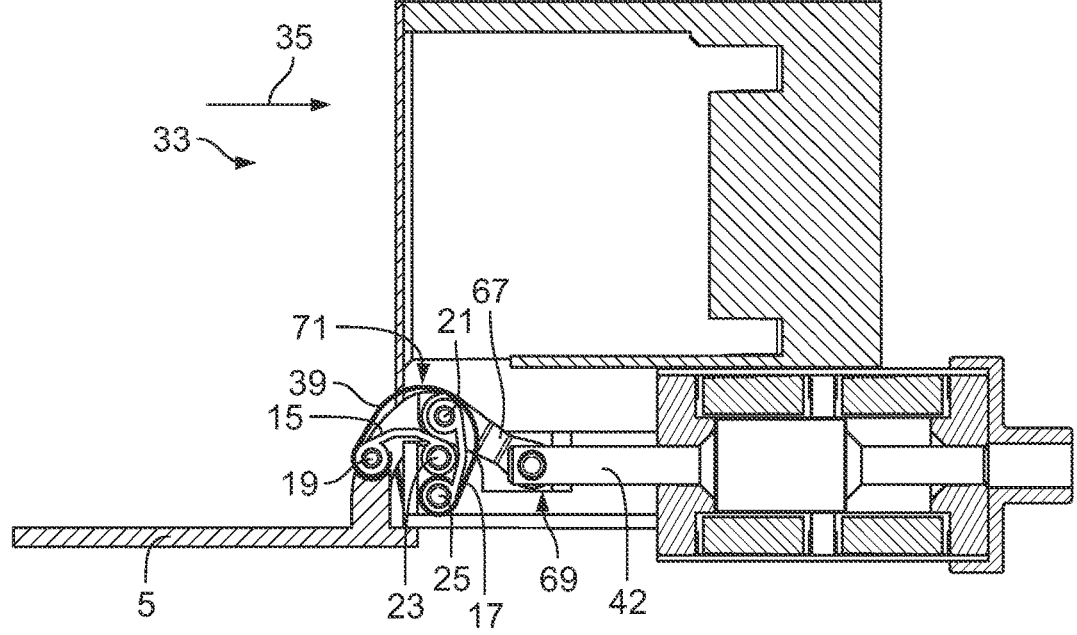
FIG. 13 is a side cross-sectional view of the connector assembly of FIG. 12 in the open position.

In the following, a fourth embodiment of the plug cover flap hinge 1 is discussed with reference to FIGS. 12 and 13.

The fourth embodiment is provided with a drive device 41 for automatically moving the cover flap 5. In this embodiment, the drive device 41 is not held by a cantilever extending obliquely to the rear. Instead, the drive device 41 is attached to the connector housing 29 and extends, both with its longitudinal extension and with a direction of movement of a lifting element 42, parallel to the plug-in direction 35.

The lifting element 42 is not connected directly to the cover flap 5, but via a connecting link 67. The connecting link 67 is movably attached to the lifting element 42 with a first end 69 and to the flap-side joint 21 of the joint element 17 with a second end 71.

By means of the connecting link 67, the linear movement of the lifting element 42, which is parallel to the plug-in direction 35, can be used to move the four-joint hinge 13.

When moving from the cover position 31 to the open position 33, the flap-side joint 21 moves at least with a directional component transverse to the plug-in direction 35. Direct drive by the lifting element 42 is therefore not possible. However, since the movable connecting link 67 follows the movement transverse to the plug-in direction 35, the flap-side joint 21 can still be moved by the drive device 41. The spring element 39 is attached at one end to the fastening-side joint 25 of the joint element 17 and at the other end to the flap-side joint 19 of the joint element 15. The spring element 39 encompasses both joint elements 15,17.

Figure 14:
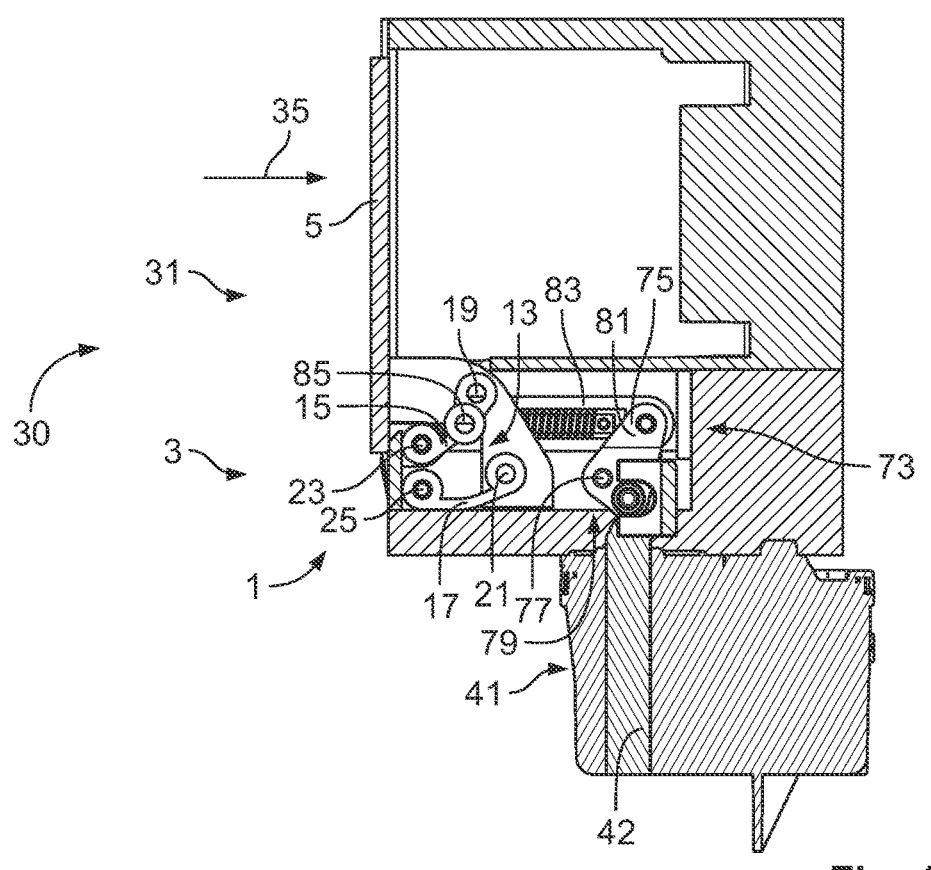
FIG. 14 is a side cross-sectional view of a fifth embodiment of a connector assembly having a plug cover flap hinge according to the invention in the cover position.
Figure 15:
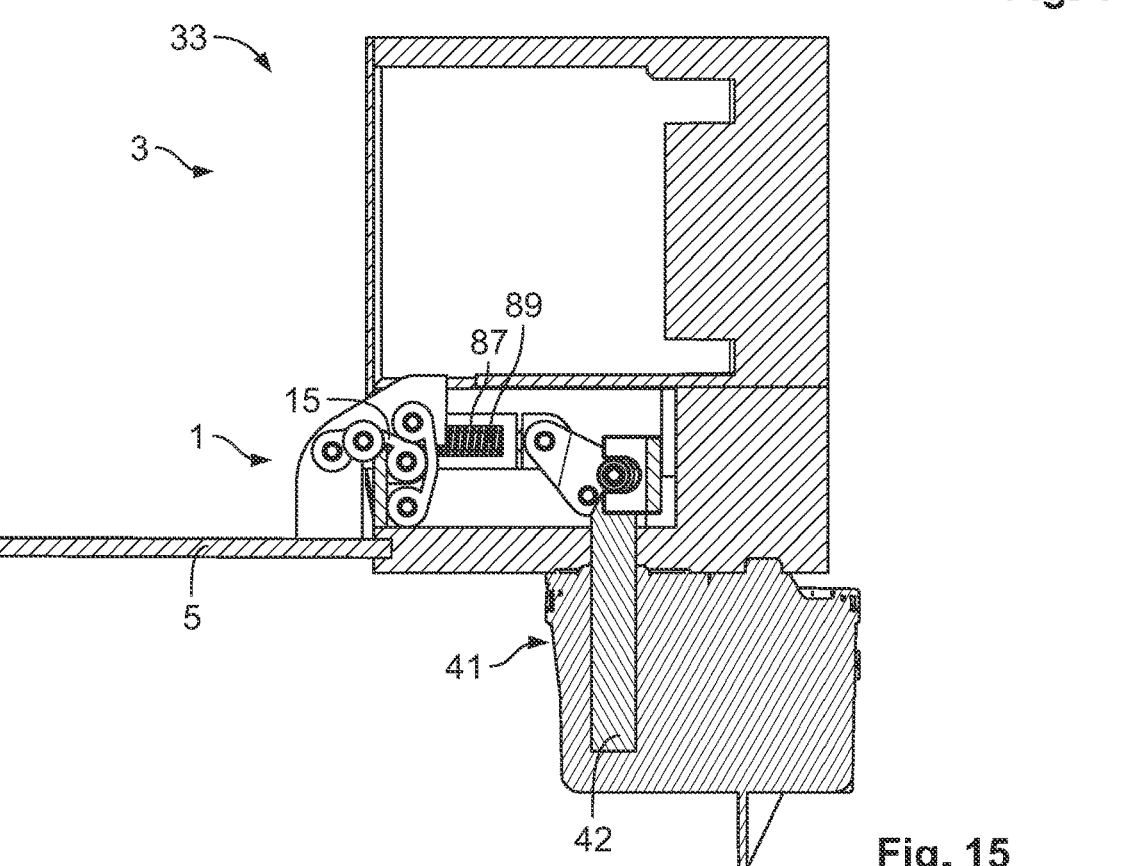
FIG. 15 is a side cross-sectional view of the connector assembly of FIG. 14 in the open position.

In the following, a fifth preferred embodiment of the plug cover flap hinge 1 according to the invention as part of a connector assembly 3 is described with reference to FIGS. 14 and 15. This embodiment is also described, for the sake of brevity, only with reference to the differences with respect to the previously described embodiments.

The four-joint hinge 13 of the fifth embodiment is similar in structure to that of the first embodiment. However, the plug cover flap hinge 1 has a drive device 41 which is different from the drive device 41 of the first embodiment. Specifically, the drive device 41 has a lifting element 42 which is movable perpendicular to the plug-in direction 35. In order to be able to move the cover flap 5 by the drive device 1, a gear 73 is provided. The gear 73 is used not only to deflect the force of the drive device 41 in the direction of the cover flap 5, or the four-joint hinge 13, but also to increase the stroke.

For this reason, the gear 73 has a deflection element 75 which is mounted rotatably about an axis 77. The deflection element 75 has a first lever 79 on the input side and a second lever 81 on the output side, the lever 81 being longer than the lever 79. This allows the stroke path to be increased. The lifting element 42 is movably connected to the first lever 79.

The second lever 81 is movably connected to a transmission element 83. The movement of the lifting element 42 transverse to the plug-in direction 35 can be converted into a movement of the transmission element 83 parallel to the plug-in direction.

In the transmission element 83, a movable piston 87 and a coil spring 89 extending around the piston are arranged. The piston 87 engages the joint element 15 and is connected to the joint element 15 via a joint 85 for this purpose. The joint 85 is located between the fastening-side joint 23 and the flap-side joint 19 of the joint element 15.

The piston 87 and the coil spring 89 are configured such that the coil spring in the cover position 31 tensions the piston in the direction of the deflection element 75. As a result, the piston 87 exerts a pull on the joint element 15. Thus, the spring force of the coil spring 89 is transmitted to the cover flap 5 in the direction of the cover position 31. An additional spring element 39 can thus be dispensed with.

The arrangement with the piston 87 and the coil spring 89 can also enable movement of the cover flap 5, when it has been moved to the cover position 31 by the drive device 41, to the open position 33 by manually overcoming the spring force of the coil spring. Releasing the cover flap 5 results in the automatic closing thereof due to the spring tension.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A plug cover hinge of a charging connection of an electric vehicle, comprising:
   a cover flap;

a four-joint hinge defining two flap-side joints attached to the cover flap and two fastening-side joints attachable to a frame, the four-joint hinge including two joint elements, each joint element connecting one of the flap-side joints to one of the fastening-side joints; and
   a spring element, with the cover flap in a cover position, the spring element generates a locking spring force urging the cover flap in a direction of the cover position, and with the cover flap in an open position, the spring element generates a locking spring force urging the cover flap in a direction of the open position.

2. The plug cover hinge according to claim 1, wherein the cover flap is lockable in at least one of the cover position or the open position.

3. The plug cover hinge according to claim 2, wherein the cover flap is repeatedly releasably lockable in at least one of the cover or open positions.

4. The plug cover hinge according to claim 2, wherein an axis of rotation of the cover flap between the open and cover positions defined by the four-joint hinge lies outside of the cover flap.

5. The plug cover hinge according to claim 1, further comprising a drive device adapted to move the cover flap.

6. The plug cover hinge according to claim 5, further comprising a gear coupling the cover flap to the drive device in a force-transmitting manner.

7. The plug cover hinge according to claim 6, wherein the drive device or the gear engages an output side on the cover flap or one of the two joint elements of the four-joint hinge.

8. A connector assembly, comprising:
   a connector housing;
   a plug cover hinge attached to the connector housing, including
      a cover flap; and
      a four-joint hinge, including:
         two flap-side joints attached to the cover flap;
         two fastening-side joints attached to the connector housing; and
         two joint elements, each joint element connecting one of the flap-side joints to one of the fastening-side joints; and
   a spring element locking the cover flap in each of an open position and a closed position of the cover flap relative to the connector housing.

9. The connector assembly according to claim 8, wherein the connector housing is a housing of a charging connector of an electric vehicle.

10. The connector assembly according to claim 8, wherein an axis of rotation of the cover flap relative to the connector housing defined by the four-joint hinge lies outside of the cover flap.

11. The connector assembly according to claim 8, wherein at least one sealing element is arranged between the cover flap and the connector housing in a closed position of the cover flap.

12. The connector assembly according to claim 11, wherein the connector housing includes a socket adapted to receive a mating connector, the socket accessible from the outside in an open position of the cover flap.

13. The connector assembly according to claim 12, further comprising a protrusion projecting beyond at least one of a plug face or the socket of the connector housing and to which at least one of the two fastening-side joints is attached.

14. The connector assembly according to claim 13, further comprising a drive device adapted to bias the cover flap into at least one of the open or closed positions.

15. The connector assembly according to claim 14, further comprising a cantilever to which the drive device is attached.

16. The connector assembly according to claim 15, wherein the cantilever is monolithically formed with the connector housing.

17. The connector assembly according to claim 15, wherein the cantilever extends along a cantilever direction between a plane of a plug face of the connector housing and a mating direction of the connector housing.

18. A plug cover hinge of a charging connection of an electric vehicle, comprising:

a cover flap;

a four-joint hinge defining two flap-side joints attached to the cover flap and two fastening-side joints attachable to a frame, the four-joint hinge including two joint elements, each joint element connecting one of the flap-side joints to one of the fastening-side joints;

a drive device moving the cover flap; and a gear coupling the cover flap to the drive device in a force-transmitting manner.

19. A connector assembly, comprising:

a connector housing;

a plug cover hinge attached to the connector housing, including a cover flap; and a four-joint hinge, including:

two flap-side joints attached to the cover flap;

two fastening-side joints attached to the connector housing; and two joint elements, each joint element connecting one of the flap-side joints to one of the fastening-side joints; and a protrusion projecting beyond at least one of a plug face or a socket of the connector housing and to which at least one of the two fastening-side joints is attached.

* * * * *